United States Patent [19]
Bjorklund et al.

[11] 4,178,079
[45] Dec. 11, 1979

[54] SUB-PICOSECOND OPTICAL GATING BY DEGENERATE FOUR-WAVE MIXING

[75] Inventors: Gary C. Bjorklund, West Windsor; David M. Bloom, Holmdel; Paul F. Liao, Fair Haven, all of N.J.

[73] Assignee: Bell Telephone Laboratories, Incorporated, Murray Hill, N.J.

[21] Appl. No.: 908,780

[22] Filed: May 23, 1978

[51] Int. Cl.² ............................................. H03F 7/00
[52] U.S. Cl. ..................................... 350/353; 307/425
[58] Field of Search .................... 307/88.3, 426, 425; 350/353

[56] References Cited

PUBLICATIONS

Topics in Applied Physics, vol. 18, "Ultrashort Light Pulses", Editor, S. L. Shapiro, (1977), Ippen et al., pp. 90–92.
Hellwarth et al., "J. Opt. Soc. Am.", vol. 67, No. 1, Jan. 1977, pp. 1–3.
Bloom et al., "Applied Physics Letters", Nov. 1, 1977, pp. 592–594.
Bloom et al., "Optics Letters", Mar. 1978, pp. 58–60.

*Primary Examiner*—Rudolph V. Rolinec
*Assistant Examiner*—Darwin R. Hostetter
*Attorney, Agent, or Firm*—Daniel D. Dubosky

[57] ABSTRACT

A high speed, wide angular aperture, spectrally selective optical gate is achieved by using degenerate four-wave mixing. The apparatus utilizes two counterpropagating pump beams to interact with a probe beam through a third order nonlinearity in the susceptibility of a medium to produce an image beam which is counterdirectional to the probe beam. The image beam is produced only during the time that the two pump beams and the probe beam are coincident in time and space in media having a fast nonlinearity. In slow media, fast gating is achieved by turning off both pump beams after the probe beam and the pump beams have interacted. This apparatus produces gate times which are not limited by the speed of relaxation of the nonlinearity in the medium utilized.

18 Claims, 4 Drawing Figures

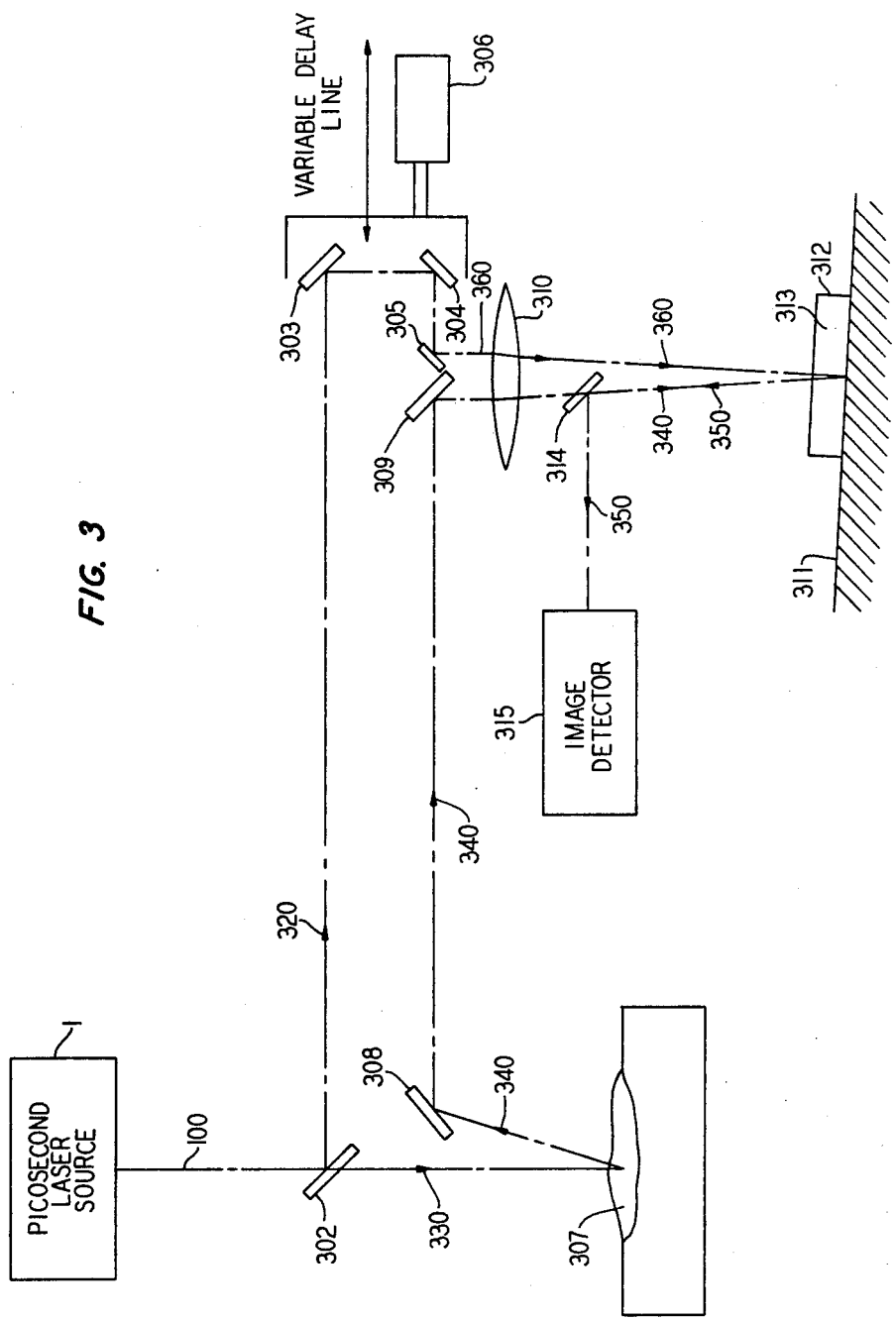

SUB-PICOSECOND OPTICAL GATING BY DEGENERATE FOUR-WAVE MIXING

BACKGROUND OF THE INVENTION

This invention pertains to the field of sub-picosecond optical gating.

There is great interest in producing optical gating devices that are useful in the sub-picosecond range of times for communications applications utilizing light. The techniques presently available require: (1) media having switching rates at least as fast as the gating desired; (2) polarizers or dispersive elements for proper operation and hence, depend on the efficiencies of these elements; and (3) large power densities for control pulses to obtain the desired gating. A further need in this area is to provide spectrally selective optical gating in order to detect signals in the presence of background.

SUMMARY OF THE INVENTION

In accordance with the present invention a sub-picosecond optical gate is provided. The apparatus operates by having two counterpropagating pump beams and a probe beam interact through a third order nonlinearity in the susceptibility of a medium to produce an image beam which is counter-directional to the probe beam. This backward image beam, which may be isolated by means of a beam splitter, is present only when the two pump beams and probe beam are coincident in time and space in media having a fast nonlinearity. In slow media, fast gating is achieved by turning off both pump beams after the probe beam and the pump beams have interacted.

One feature of the invention is that the high speed gating times achieved are not limited by the speed of relaxation of the nonlinearity in the particular medium chosen.

Another feature of the invention is that the optical gating thusly provided is spectrally selective. A backward image beam will only be generated when the probe beam is of substantially the same frequency as that of the pump beams.

Yet another feature of the invention is that the optical gate formed has a wide angular aperture. Thus, the strength of the nonlinear interaction is not sensitive to the direction of the probe beam. This means that a backward image can be generated using a probe beam having components with wide angular divergence.

Yet another feature of the invention is that the backward image beam produced retains the spatial information contained in the object image.

Yet another feature of the invention is that there is no background signal produced when the pump beams and the probe beam are not time coincident. This provides a good signal-to-noise ratio for the detection of weak signals.

Yet another feature of the invention is that the optical gate is polarization sensitive when used with certain materials, such as $CS_2$, in which a polarization grating may be generated. The pump beams and the probe beam can be orthogonally polarized. This will cause the polarization of the backward image beam to be that of the probe and results in a further improvement in the signal-to-noise ratio by allowing polarization isolation of any scattered pump light.

Yet another feature of the invention is that the backward image beam produced may be amplified by the four-wave degenerate mixing and provide for better detection of probe beams.

BRIEF DESCRIPTION OF THE DRAWING

A complete understanding of the present invention and of the above and other features thereof may be gained from a consideration of the following detailed description presented hereinbelow in connection with the accompanying diagram in which:

FIG. 3 shows in partially pictorial, partially schematic form a range gate in accordance with another embodiment of the invention.

DETAILED DESCRIPTION OF THE DRAWING

Figure 1:
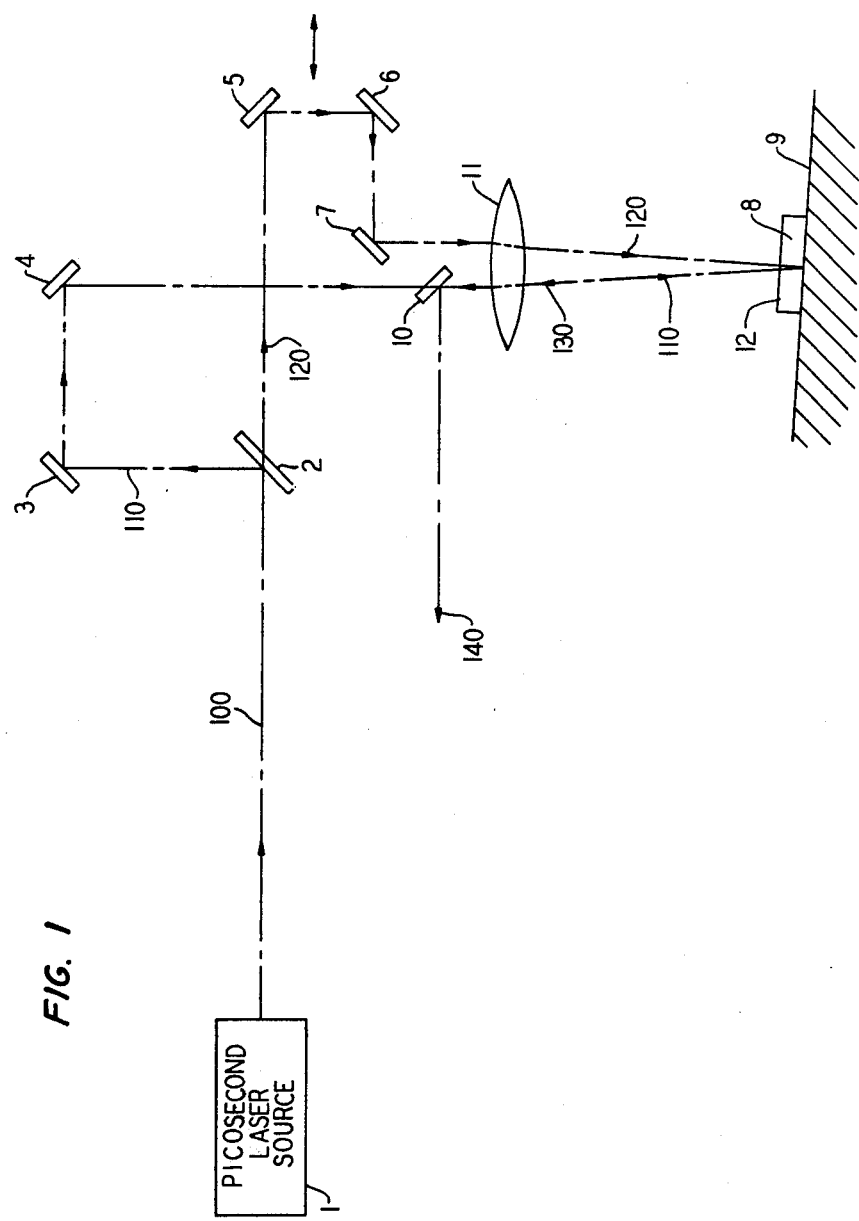
FIG. 1 shows in partially pictorial, partially schematic form an embodiment in which the principal of operation was demonstrated.

The principal of operation and efficiency of the invention has been demonstrated in the embodiment shown in FIG. 1. Laser beam 100 was created by picosecond laser source 1. Picosecond laser source 1 consisted of a passively mode locked, cavity dumped dye laser pumped by an argon ion laser as disclosed in *Topics in Applied Physics*, Vol. 18, 1977, *Ultrashort Light Pulses*, Editor: S. L. Shapiro, in the article entitled "Techniques for Measurement" by E. P. Ippen and C. V. Shank on page 99. The cavity dumped pulses were then amplified in a dye amplifier system pumped by a frequency doubled Nd:YAG laser. Laser source 1 provided 100μJ pulses with a $0.5 \times 10^{-12}$ second pulse length at 10 pps for laser beam 100. Light in beam 100 from picosecond laser source 1 was split into beam 110 and beam 120 at beam splitter 2. Beam 110 was then steered into the desired direction by subsequent reflection from reflectors 3 and 4. Beam 120 was sent into a variable delay made up of reflectors 5, 6 and 7 in order to obtain synchronism between pulses. Both beam 120 and beam 110 were parallel prior to entry into a 50-cm lens 11. Lens 11 focused beams 110 and 120 so that they would intersect in space precisely at the interface between mirror 9 and the Kerr medium 8 inside cell 12. Cell 12 contained a Kerr medium, $CS_2$, which was in direct contact with mirror 9. Cell 12 consisted of a cuvette with a quartz entrance window and highly reflecting mirror 9 separated by ~50μm. Mirror 9 was aligned to retroreflect incident beam 120 in order to produce the counterpropagating pump beams. Backward generated beam 130 was picked off by beam splitter 10 and detected as beam 140. The energy in detected backward image beam 140 was about equal to the energy in incident object wave 110. By varying the delay between beams 110 and 120 and monitoring the strength of the backward wave, it was found that time coincidence within $\pm 0.5 \times 10^{-12}$ seconds was necessary for generation of backward image beam 140. It is important to note that the orientational relaxation rate in $CS_2$ is ~2 picoseconds and the switching speed of the gate has been demonstrated to be even faster. This result occurs because energy from the pump beams are diffracted into the backward image beam only when at least one of the pump beams is present. Thus, the speed of the gate is tied to the speed of the pump beams and is not affected by the speed of relaxation of the medium.

The measurement to verify the fact that the pulse length of the backward image beam is determined by the speed of the pump beams was made according to an apparatus disclosed in *Topics in Applied Physics*, Vol. 18, 1977, *Ultrashort Light Pulses*, Editor: S. L. Shapiro, in the article entitled "Techniques for Measurement" by E. P. Ippen and C. V. Shank on page 91. The only changes made to the apparatus disclosed was to eliminate the chopper because the repetition rate of picosecond laser source 1 was low and to replace the lock-in amplifier with a box-car integrator. The measurements made verified the fact that the backward image beam was present when all three beams were coincident in time and disappeared when the pump waves were removed. In order to verify the fact of coincidence gating, the delay between the pump beam and the probe beam was varied by a stepping motor drive and the backward image beam amplitude was measured as a function of this delay. The backward image beam was detected by a photomultiplier whose output was averaged by a box-car integrator and fed into a multichannel analyzer in substantially the same manner as was used for the pulse length measurement described above.

A further investigation was performed in the time response of the four-wave mixing signal. For a medium having a relaxation time $\tau$, a simple rate equation calculation shows that the backward image beam intensity must rise as $(1-\exp(-t/\tau))^2$ when the probe beam is suddenly turned on and must as $\exp(-2t/\tau)$ when the probe beam is turned off. Ruby is a medium having a slow relaxation time. It was pumped with a cw argon ion laser.

Figure 4:
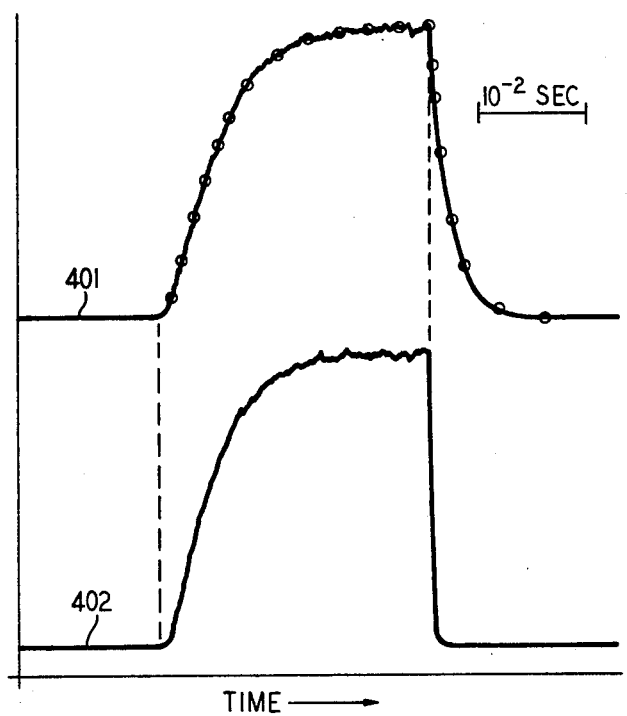
FIG. 4 shows in curve 401 the observed time response of the backward image beam intensity from a ruby with a square probe pulse, and in curve 402 shows the observed time response of the backward image beam intensity from a ruby where the pump wave is pulsed on and off instead of the probe.

Curve 401 in FIG. 4 shows the excellent agreement between the functional forms (open circles) and the observed response to a square probe pulse. When the pump beam was pulsed on and off instead of the probe the backward beam intensity waveform obtained is shown on curve 402 in FIG. 4. The rise is identical to that of curve 401. However, the fall is abrupt. This rapid response is therefore not limited by the response of the nonlinear medium and demonstrates that even slow media such as ruby may be used as an element in a rapid optically activated gate.

As was disclosed in "Conjugate Wavefront Generation and Image Reconstruction by Four-Wave Mixing" by D. M. Bloom and G. C. Bjorklund in *Applied Physics Letters*, Vol. 31, No. 9, Nov. 1, 1977, pp. 592-594, the backward image beam produced by the four-wave mixing is a conjugate wavefront.

The phasematching condition for the four-wave mixing may be expressed as $$\vec{k}_{p1} + \vec{k}_{p2} - \vec{k}_{probe} = \vec{k}_{backward}. \quad (1)$$

The fact that the two pump beams are counterpropagating leads to the conclusion that the backward image beam produced will propagate in exactly the opposite direction as does the probe beam. We also note that due to the fact that the probe beams are counterpropagating, the phasematching condition may be satisfied for any acceptance angle. Although the acceptance angle for the probe beam is not limited by phasematching when the pump beams are counterpropagating, there are phasematching requirements which restrict the amount by which the acceptance angle of the pump beams may vary and still retain the benefits of degeneracy (i.e., substantially counterpropagating probe beams). This limit is derived from the following equation which restates the phasematching condition:

$$\left| \left( \left| \vec{k}_{p1} + \vec{k}_{p2} - \vec{k}_{probe} \right| - \frac{\omega}{c} \right) \times L \right| \lesssim \pi, \quad (2)$$

where $\omega$ is the frequency of the beams and $L$ is the interaction length. If we consider the plane containing the pump beams and the probe beam, the acceptance angle for pump beam divergence in this plane is $\delta\theta = \lambda/L$ when the probe and pump beams are orthogonal. The acceptance angle for pump beam divergence out of this plane is given by $\delta\theta = (\lambda/2L)^{1/2}$. However, if the probe beam is substantially aligned with the pump beams, then the acceptance angle for beam divergence of the pump beams in the plane also reduces to $\delta\theta = (\lambda/2L)^{1/2}$.

Thus, in general any pair of pump waves collimated to their diffraction limit to a transverse dimension in each direction such as to maintain overlap of the beams over a length $L$ will meet these acceptance angle requirements. This is important as it will allow utilization of lower power lasers to produce the necessary power densities to drive the four-wave mixing process.

As was discussed hereinabove, the phasematching condition presupposes that the pump beams have the same frequency. The spectral selectivity of the gate arises from the fact that the pump beams may be detuned from the probe beam by an amount which depends upon the type of material having the nonlinearity in susceptibility.

The amount of detuning allowable for materials having a fast relaxation time for the nonlinearity such as Retinal and Retinol Acetate is $\Delta < c\pi/2L$, where $\Delta$ is the amount of detuning, $c$ is the speed of light and $L$ is the interaction length where the probe and the pump beams overlap in the medium. Thus, one may detune the pump and probe beams a larger amount as the length of interaction in the nonlinear medium gets smaller. For materials having a slow relaxation time for the nonlinearity, we find that the allowable detuning is $\Delta < 1/\tau$ where $\tau$ is the smaller of $\tau_{relax}$ and $\tau_{pulse}$. These limits for detuning are used to determine the range of spectral selectivity achievable with the gate according to the particular material used.

Figure 2:
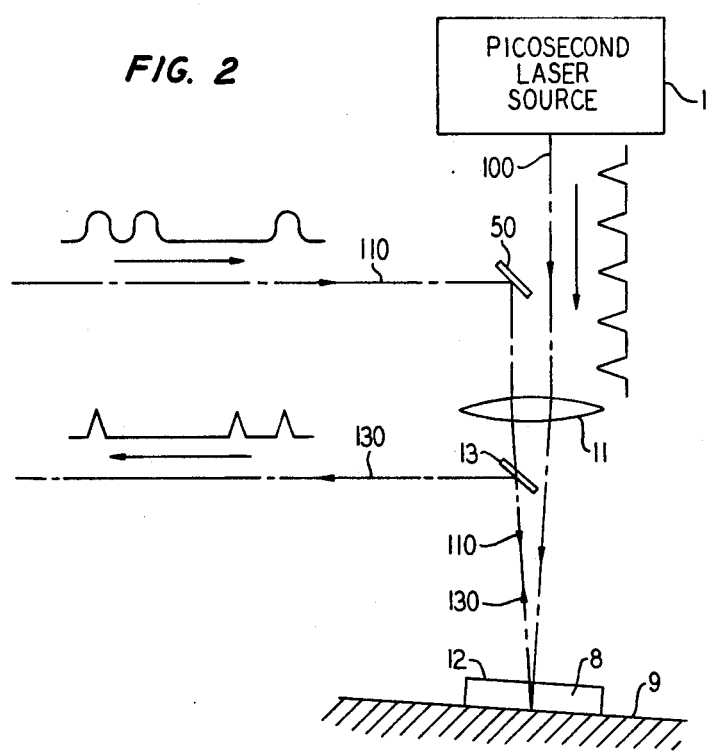
FIG. 2 shows in partially pictorial, partially schematic form a picosecond optical gate constructed in accordance with the present invention.

FIG. 2 shows an optical gate according to the present invention. Beam 100 is produced by picosecond laser source 1. Light in beam 100 from picosecond laser source 1 is focused by lens 11 to the interface between nonlinear medium 8 and reflecting surface 9. Cell 12 contains nonlinear medium 8 so that it maintains direct contact with mirror 9. Mirror 9 is aligned to retroreflect incident beam 100 in order to produce counterpropagating pump beams. For the application of the gate to picosecond pulses it is important to focus the beams to intersect at the interface between nonlinear medium 8 and mirror 9 because the pulses are only 300 μm in free space. Keeping the interaction at the mirror interface insures overlap.

Radiation from beam 110 is reflected from a reflector 50 so as to enter lens 11 parallel to beam 100. Lens 11 focuses beam 110 to intersect beam 100 at the interface between nonlinear medium 8 and mirror 9. Backward image beam 130 is generated when all three beams overlap and propagates in exactly the opposite direction from beam 110. Beam 130 is picked off by a beam splitter 13.

In the particular application shown in FIG. 2 beam 110 contains a beam which has pulses encoded on it at a specific repetition rate. The shape of the pulses has become distorted and the use of picosecond laser source 1 at the proper repetition rate in the optical gate has reshaped the pulses, as shown on beam 130. In this particular application the only requirement on the nonlinear medium is that it respond fast enough to meet the repetition rate of the incoming beam. It does not have to respond at the picosecond pulse-width rate.

The optical gate disclosed in the present invention may be used as an important element in range gating devices to provide a high sensitivity. With 1 picosecond pulses, range gating can be obtained which gives a distance accuracy of 300μm. Also the fact that the optical gate is highly spectrally selective, as discussed above, allows for detection of signals in range gating devices in the presence of florescence backgrounds. Both of these properties are particularly useful for range gating techniques involved in studying blood vessels or internal organs in vivo where the distances involved are small and background radiation is expected from the tissues present.

FIG. 3 discloses the use of the present invention in a range gating apparatus. Picosecond laser source 1 produces laser beam 100 which impinges upon beam splitter 302. Beam 320 is directed to a variable delay line made up of reflectors 303, 304 and 305 which is adjusted by stepping motor 306 to produce the beam 360. Beam 330 from beam splitter 302 impinges upon target 307. Beam 330 is reflected from target 307 to form beam 340 which in turn is directed to be parallel to beam 360 by reflectors 308 and 309. Beams 340 and 360 are focused by lens 310 to intersect at the interface between reflecting mirror 311 and cell 312. Mirror 311 is tilted such that beam 360 is reflected back upon itself so as to form the counterpropagating pump waves necessary for the four-wave mixing mechanism. Cell 312 contains a nonlinear medium 313. Backward image beam 350 is generated by the degenerate four-wave mixing process in nonlinear medium 313.

Beam splitter 314 picks off backward wave 350 and transmits it to image detector 315. According to the four-wave mixing process, beam 350 contains all the spatial information obtained from target object 307 and thus may be viewed in detector 315 as a reproduced real image of that target with the following proviso:

(1) We are examining that part of the target which corresponds to light reflected from the optical depth giving pulses synchronous with the pulses in beam 320 which enter the variable delay line.

(2) Due to the spectral selectivity of the four-wave mixing process, we have obtained a background free image with respect to wavelength.

(3) Due to the optical gating we have obtained an image which is temporally background free.

"Slices" of the object are examined at different depths by varying the length traversed by beam 320 by adjusting the variable delay line made up of reflectors 303, 304 and 305 using stepping motor 306. Only the images in probe beam 340 that are coincident spacially and temporally with the counterpropagating pump beam pulses from beam 360 at the interface between mirror 311 and medium 313 in cell 312 will be observed in image detector 315.

The efficiency of the invention is not limited by the embodiments shown and may be practiced by use of other methods of producing third order nonlinearities in susceptibility.

What is claimed is:

1. An optical gate for producing an output beam in response to two input beams, one of said two input beams having information to be gated, and the other one of said two input beams having gating pulses at the instants when gating is to be performed, said gating pulses having a width which is less than or equal to a picosecond, said optical gate comprising,
   a medium having a reflecting surface on one side thereof and a third order nonlinearity in susceptibility,
   means for directing and focusing said two input beams to intersect at the interface between said medium and said reflecting surface, said reflecting surface being oriented such that said input beam having gating pulses impinges thereon at substantially a right angle and said input beam having information to be gated impinges thereon at an angle other than a right angle, and
   means positioned in the path of the other one of said input beams to separate an output beam that is generated within said medium.

2. An optical gate as defined in claim 1 wherein, said means for directing and focusing said input beams includes at least one beam splitter means for orienting one of said input beams parallel to the other one of said input beams, and a lens for focusing the resulting parallel beams to intersect at the interface between said medium and said reflecting surface.

3. An optical gate for producing an output beam in response to an input beam and a gate beam, said input beam having information pulses, said gate beam comprising a train of gate pulses having a width less than or equal to a picosecond and a repetition rate, said output beam comprising output pulses conveying all of or a subset of said information pulses, said optical gate comprising:
   a medium placed in contact with a reflecting surface, said medium having a third order nonlinearity in susceptibility;
   means for focusing and directing said gate beam and said input beam to intersect said reflecting surface at the interface between said medium and said reflecting surface, said reflecting surface being oriented such that said gate beam impinges thereon at substantially a right angle and said input beam impinges thereon at an angle other than a right angle, thereby causing said medium to generate an output beam having a direction of propagation opposite from said input beam, said output beam containing an output pulse when one of said information pulses is substantially coincident with one of said gate pulses; and
   means for separating said output beam from said input beam.

4. The optical gate defined in claim 3 wherein said means for focusing and directing said gate beam and said input beam includes at least one beam splitter and a lens.

5. The optical gate defined in claim 3 wherein said medium is $CS_2$.

6. The optical gate defined in claim 3 wherein said medium is Retinal.

7. The optical gate defined in claim 3 wherein said medium is Retinol Acetate.

8. The optical gate defined in claim 3 wherein said medium is a ruby crystal.

9. The optical gate defined in claim 3 wherein said medium is an atomic metallic vapor.

10. The optical gate defined in claim 3 wherein said medium is Nd:YAG.

11. A range gate for selectively producing images from a plurality of depths in a target object in response to gating pulses in a laser beam each of said gating pulses having a specified width, said range gate comprising:
    splitter means for generating a gate beam and a source beam from said laser beam;
    means for irradiating said target object with said source beam to produce a reflected beam;
    a medium placed in contact with a reflecting surface, said medium having a third order nonlinearity in susceptibility;
    means for selectively varying the path length traversed by said gate beam to provide a delayed gate beam;
    means for focusing and directing said delayed gate beam and said reflected beam to intersect said reflecting surface substantially at the interface between said medium and said reflecting surface, said reflecting surface being oriented such that said delayed gate beam intersects said reflecting surface at substantially a right angle, thereby generating an image beam directly opposite to said reflected beam for those components of said reflected beam that spectrally, spacially and temporally overlap said gate beam at said interface; and
    means for separating said image beam from said reflected beam.

12. The range gate defined in claim 11 wherein said gate pulses are picosecond pulses.

13. The range gate defined in claim 11 wherein said medium is $CS_2$.

14. The range gate defined in claim 11 wherein said medium is Retinal.

15. The range gate defined in claim 11 wherein said medium is Retinol Acetate.

16. The range gate defined in claim 11 wherein said medium is a ruby crystal.

17. The range gate defined in claim 11 wherein said medium is an atomic metallic vapor.

18. The range gate defined in claim 11 wherein said medium is Nd:YAG.

* * * * *